(12) United States Patent
Huhta-Koivisto et al.

(10) Patent No.: US 8,826,676 B2
(45) Date of Patent: Sep. 9, 2014

(54) GREENHOUSE, GREENHOUSE CLIMATE CONTROL SYSTEM AND METHOD OF CONTROLLING GREENHOUSE CLIMATE

(75) Inventors: Esko Huhta-Koivisto, Espoo (FI); Jukka Huttunen, Unaja (FI)

(73) Assignee: Navarbo Oy, Eura (FI)

( * ) Notice: Subject to any disclaimer, the term of this patent is extended or adjusted under 35 U.S.C. 154(b) by 1934 days.

(21) Appl. No.: 11/720,445

(22) PCT Filed: Dec. 1, 2005

(86) PCT No.: PCT/FI2005/000520
§ 371 (c)(1),
(2), (4) Date: Apr. 15, 2008

(87) PCT Pub. No.: WO2006/058959
PCT Pub. Date: Jun. 8, 2006

(65) Prior Publication Data
US 2008/0271367 A1  Nov. 6, 2008

(30) Foreign Application Priority Data
Dec. 3, 2004 (FI) .................................. 20041572

(51) Int. Cl.
*F25D 17/06* (2006.01)
*F24F 5/00* (2006.01)
*A01G 9/24* (2006.01)

(52) U.S. Cl.
CPC ............... *A01G 9/246* (2013.01); *Y02B 30/545* (2013.01); *F24F 5/0035* (2013.01)
USPC ................................................. 62/93; 62/119

(58) Field of Classification Search
CPC ........... F28F 25/00; F28F 25/02; F28F 25/06; F28C 2001/006; F28B 9/06
USPC ....................... 62/91, 119, 93; 261/111, 119.1
See application file for complete search history.

(56) References Cited

U.S. PATENT DOCUMENTS

| | | | |
|---|---|---|---|
| 2,118,949 A * | 5/1938 | Scott ................................. | 62/91 |
| 4,044,078 A | 8/1977 | Curtis et al. | |
| 4,287,721 A | 9/1981 | Robison | |
| 4,707,995 A | 11/1987 | Assaf | |
| 4,760,636 A | 8/1988 | St. Angelo, Jr. et al. | |
| 4,869,070 A * | 9/1989 | Assaf ................................. | 62/94 |
| 5,403,521 A * | 4/1995 | Takahashi ....................... | 261/26 |
| 6,018,954 A * | 2/2000 | Assaf ................................. | 62/94 |
| 6,463,750 B2 * | 10/2002 | Assaf ............................... | 62/271 |
| 2003/0188477 A1 * | 10/2003 | Pasternak et al. ................ | 47/17 |

FOREIGN PATENT DOCUMENTS

| CN | 2082078 | 8/1991 |
|---|---|---|
| EP | 517432 | 12/1992 |
| JP | 4148123 | 5/1992 |

(Continued)

*Primary Examiner* — Cassey D Bauer
(74) *Attorney, Agent, or Firm* — Fasth Law Offices; Rolf Fasth

(57) ABSTRACT

The system is for regulating the climate of the greenhouse. The warm greenhouse air is cooled by cooling water. The system has a spray condenser that includes a conduit for leading the cooling water to the condenser. The condenser has a blower to transfer warm air to be cooled to the condenser. The warm air from the greenhouse is used to warm the water sprayed from the spray condenser. The cooling water may be delivered from an evaporator that has water that is cooled by outside air blown into the evaporator.

20 Claims, 3 Drawing Sheets

(56) References Cited

FOREIGN PATENT DOCUMENTS

Figure 1:
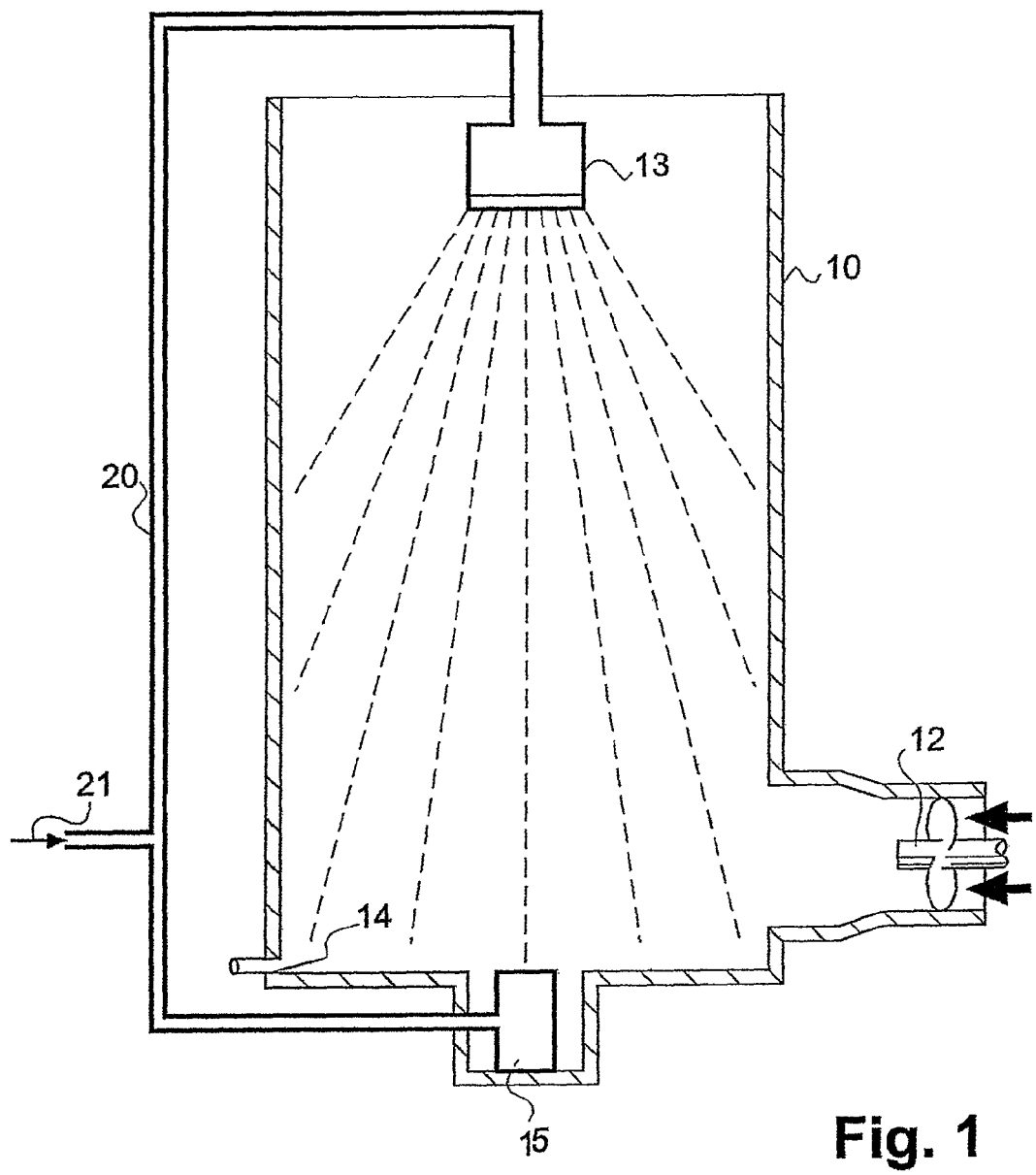

| | | |
|---|---|---|
| JP | 5-065298 | 9/1993 |
| JP | 8-155843 | 6/1996 |
| JP | 2002267283 | 9/2002 |
| JP | 2002330640 | 11/2002 |
| WO | 01/74541 | 10/2001 |

* cited by examiner

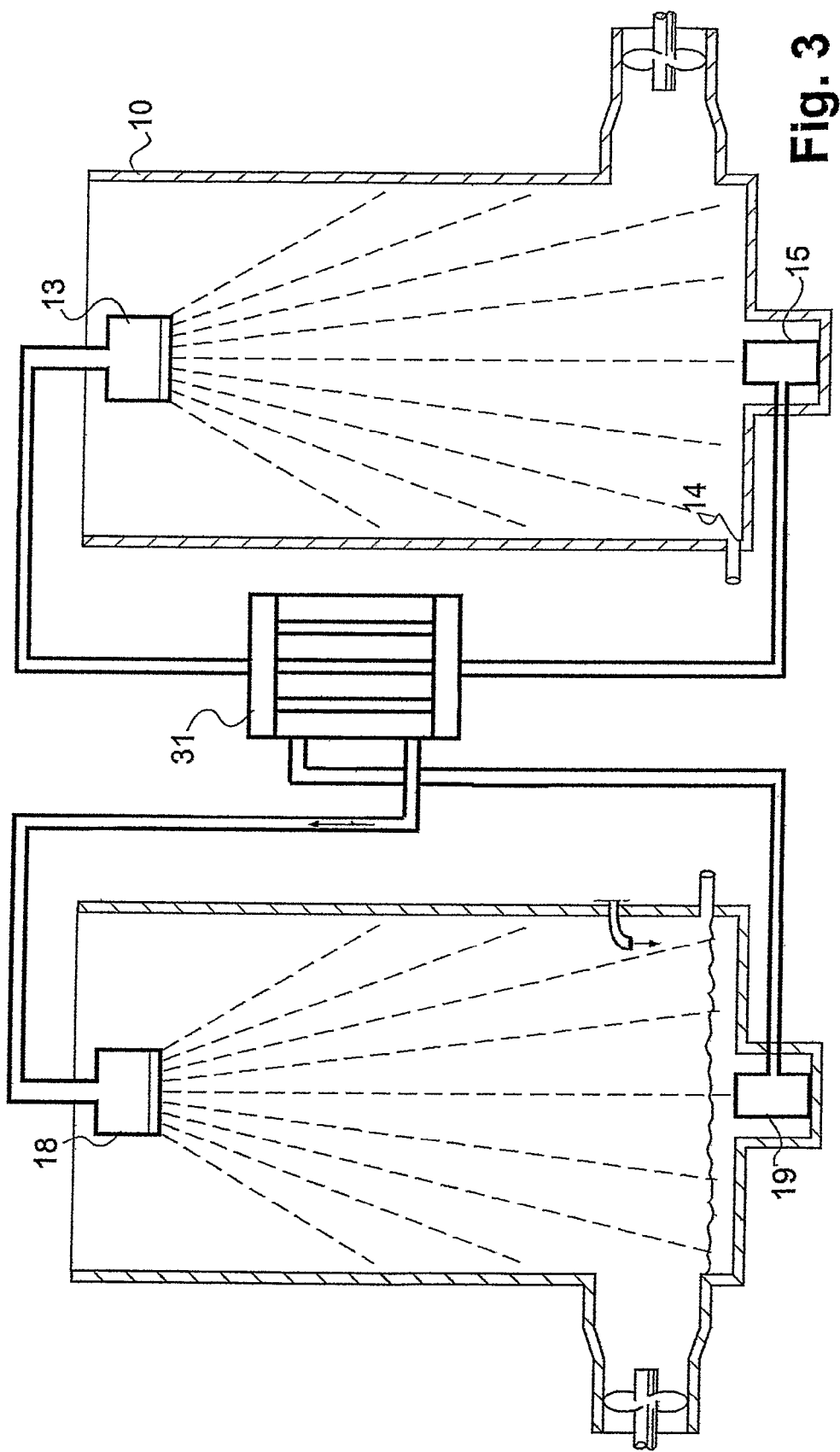

US 8,826,676 B2

GREENHOUSE, GREENHOUSE CLIMATE CONTROL SYSTEM AND METHOD OF CONTROLLING GREENHOUSE CLIMATE

PRIOR APPLICATIONS

This is a US national phase patent application that claims priority from PCT/FI2005/000520, filed 1 Dec. 2005, that claims priority from Finnish Patent Application. No. 20041572, filed 3 Dec. 2004.

TECHNICAL FIELD

This invention comprises a greenhouse, a greenhouse climate control system and a method of controlling greenhouse climate.

TECHNICAL BACKGROUND

Previously known greenhouses are those in which the climate is controlled by means of ventilation doors or blowers. In those, excess sun energy and excess moisture are removed from the greenhouse by means of ventilation. In optimal growing conditions, the temperature is ca 18-25° C., the air humidity ca 70-90% and the carbon dioxide concentration more than 1000 ppm. Optimal growing conditions require a good control of the air temperature, moisture and carbon dioxide concentration. It is clear that this can not be reached in an open greenhouse. As the cooling takes place by means of external air in an open greenhouse, the temperature of the greenhouse will, especially during the best growing period, rise over the goal. In summer the use of excess carbon dioxide (over the outside level of 350 ppm) does not work as the given carbon dioxide can get out from the greenhouse in connection with the ventilation. An open greenhouse is either not desired in view of the energy consumption. When excess sun energy is ventilated out daytime, heating of the greenhouse is needed at night. In addition, ventilation to remove moisture has to be performed in spring and autumn, which requires additional heating.

The inside air is almost isolated from the outside air in a closed greenhouse. Outside air is not let in from ventilation doors and it is not blown to the greenhouse with blowers but instead, extra heat is lead out technically and also the carbon dioxide needed by the plants is produced technically and its concentration is preferably raised to a level of at least 500-1500 ppm. A closed greenhouse is considered to be the ideal solution for plant growing because the climate can be controlled optimally for the growing of the plants. The use of the closed greenhouse is in first hand restricted by the bad functionality or the high costs of the earlier solutions.

Several international patents have been made for a greenhouse system, wherein the climate control is performed by means of a closed system. WO 00/76296 presents a solution that is based on the use of underground water storages. This solution is possible only in restricted situations as there usually are no underground water basins available. Furthermore, in order to decrease the need of cooling water, water heat accumulators are used in such solutions wherein approximately a half of the daily sun energy is accumulated to be used for the heating of the greenhouse at night. The size of these heat accumulators is however big, for example ca 200 cubic meters for a 1000 square meter greenhouse. The costs required by such a system are of the above reasons considerable and it has not become very general in practice.

In EP patent 0 517 432 A 1, such a heat accumulator is presented to which the daily sun energy is collected and from which a part is taken out during nights for the heating of the greenhouse and a part is lead to the cooler air at night. In this case, the size of the heat accumulator has to be ca 400 cubic meters for a 1000 square meter greenhouse. The big size of the required heat accumulator makes the whole system expensive and the system is not in common use.

References is also made to U.S. Pat. No. 4,044,078 as prior art, which presents an apparatus developed for cooling of storages, in which cold water is sprayed from above trough a grid frame against an air flow and the heated water is cooled with an external cooler. The incidence speed of the air and the water is because of the structure very small, wherefore the apparatus would be very big if used for cooling of greenhouses. Furthermore, the apparatus is not suitable for condensing moisture in the air, because there is only a water inlet but no outlet. The above mentioned facts make the solution not suitable for greenhouse use.

US 2003/0188477 A1 contains a conventional open cooling system for greenhouses, wherein dry outer air is lead to the system which is cooled down along with the evaporation of water of an ambient temperature sprayed to it. Because of the way how the air and water meet, the speed is low, leading to a weak heat exchange. As outer air is blown in the system in to the greenhouse, it is not suitable for cooling of a closed greenhouse. Neither can excess moisture be removed from the greenhouse by means of this method, but the humidification of the air to be blown inside increases the need of removing moisture from the greenhouse by ventilation.

U.S. Pat. No. 4,707,995 comprises a system for the control of the air humidity and temperature of the greenhouse, the function of which is based on the use of salt water for removing moisture. As in the foregoing solution, air is transported through of water spray and the treated water is collected and recovered outside the apparatus. The apparatus is not generally suitable for cooling of greenhouses or removal of moisture.

A similar solution is also presented in JP-publication 4148123 A 19920521. Water is sprayed from above and there are also ventilation devices in the apparatus and the air blown by them is intended to come into heat exchange contact with the sprayed water.

Also in JP-publication 2104222 A 19900417, heat exchange between water and air is used for cooling air in greenhouses. The apparatus comprises a heat exchanger working with cold groundwater with which the greenhouse is cooled from above during nights by means of inlet air and moisture is removed from the lower end of the device. The efficiency of the system is not sufficient to remove daily heat from a closed greenhouse.

THE OBJECT OF THE INVENTION

The object of this invention is such a greenhouse and a method, which can be realized in different environments, especially as a closed application and by means of which the extra investments required by a closed greenhouse is only a little part of those of the solutions above described.

SUMMARY OF THE INVENTION

The invention is concerned with a system for the control of greenhouse climate by means of cooling water. The system comprises a condenser, means for leading cooling water to the condenser and an outlet in the condenser to lead out water heated by the air of the greenhouse from the condenser. It is mainly characterized in that it furthermore comprises a pump to lead the main part of the water from the condenser back for circulation to the means and a blower to transfer warm air to be cooled down to the condenser.

The invention is also concerned with a greenhouse with a system for the control of the greenhouse climate by means of cooling water, the system comprising a condenser, means for leading cooling water to the condenser and an outlet in the condenser for leading out water warmed up by the air of the greenhouse from the condenser. The system in the greenhouse furthermore comprises a pump for leading water from the condenser mainly back for circulation to the means.

The method of the invention for controlling greenhouse climate in a greenhouse is connected to a system comprising a condenser, means for leading out cooling water to the condenser and an outlet for leading out water heated by the air of the greenhouse in the condenser from the condenser. In the steps of the method cooling water is introduced in the condenser from which it is let to meet the air introduced to the condenser for cooling of that air. The water heated up by the air of the greenhouse is removed from the condenser. The main part of the water to be removed from the greenhouse is let for circulation to the upper end of the condenser.

The advantageous embodiments of the invention have the characteristics of the independent claims. In some advantageous embodiments, the wall of the greenhouse can be a part of the structure of the condenser and of an evaporator to be connected to that.

In some advantageous embodiments, the invention is realized as a closed greenhouse.

The greenhouse of the invention does not need any ventilation doors for its normal function or other conventional ventilation systems. Instead it contains:
  means for heat control in order to remove extra heat or to give extra heat
  means for controlling moisture to keep the moisture optimal
  means for introducing carbon dioxide The following advantages are achieved with the greenhouse system of the invention:
  A 20-50+% bigger yield, because of the optimal control of temperature, moisture and especially carbon dioxide concentration and because light energy better can be made use of
  An essentially smaller need of heating energy
  An essential decrease in the use of plant protecting substances
  In several applications, an essential saving in water based on the recovery of water evaporated by the plants in the condenser
  The time of yield can because of a better regulation be determined in advance and thus the end result can be optimized
  A better use of artificial light
  Essentially lower construction and use costs than those needed for earlier presented solutions for the same thing.

In the following, the invention is presented more in detail by referring to different embodiments by means of figures. The invention is not intended to be restricted to the details of these.

FIGURES

Figure 2:
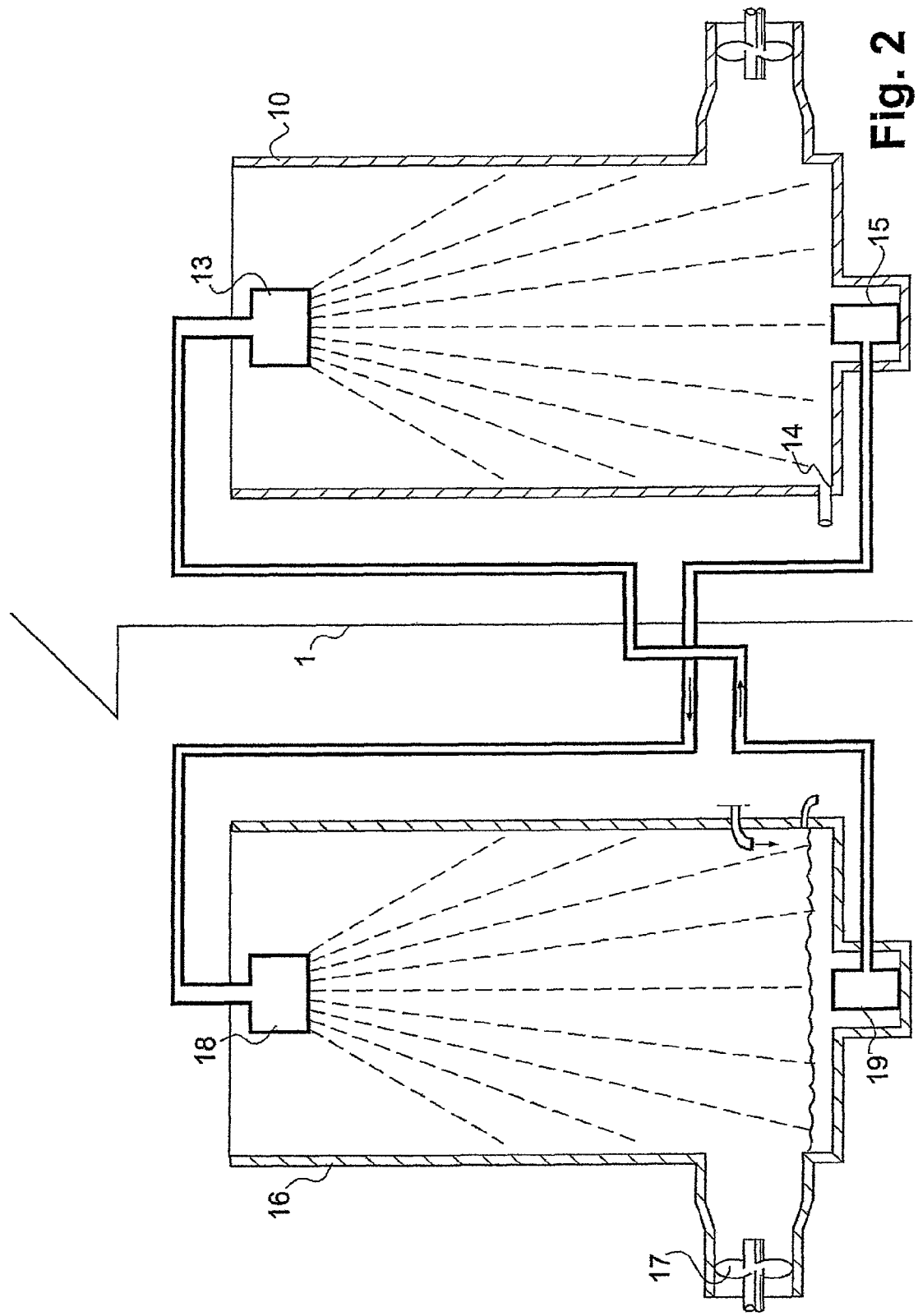

FIG. 1 presents an embodiment of the invention, wherein there is a condenser in the climate control system of the greenhouse FIG. 2 is an embodiment of the invention, wherein there is a condenser and an evaporator in the climate control system of the greenhouse FIG. 3 presents another such an embodiment of the invention having a condenser and an evaporator.

DETAILED DESCRIPTION OF THE INVENTION

The conditions differ essentially from each other during different seasons of the year in view of the climate control of greenhouse. The apparatuses and methods of the invention are especially useful in midsummer and also in spring and fall. In midsummer, when the radiation energy of the sun is biggest, the heat energy to be lead out from the greenhouse has its maximum and on the other hand the need for night heating is minimal.

FIG. 1 presents an embodiment of the invention, wherein there is a condenser 10 in the climate control system of the greenhouse and which explains for example the cooling of the greenhouse according to the invention.

FIG. 1 has a condenser 10, which here is a spray condenser to the lower end of which warm air from the greenhouse is blown by means of a blower 12, which flows upwards through the condenser 10 and is returned back to the greenhouse. Cold or cool water is lead to the means 13 in the upper end of the condenser, here a sprinkler, from the outside of the greenhouse 1, partly from another water storage, for example from a sea, river etc. through pipe 21 to pipe 20 and as circulation water from the lower end of the condenser through pipe 20. The cold water is lead down through small holes in the sprinkler 13. Thin water jets with a speed of ca 2 m/s meet the air flow that is moving upwards, the speed of which most preferably is ca 5 m/s, whereby an efficient heat exchange takes place between the water and the air. The temperature of the air returning to the greenhouse lowers to a level close to the temperature of the water flowing to the condenser. The temperature and the amount of water decide the temperature and the moisture of the return air. The water collected on the bottom of the condenser is lead by means of the pump 15 again to the sprinkler 13 for effecting the heat exchange. The amount of water regulated in accordance with the amount coming from an outer water source or other water source is removed from the system back to another water system via an outlet 14 in the lower end of the condenser. The humidity of the greenhouse air condensed into the water is also removed in this way. The outlet 14 is essential, because without that the apparatus is over flown somewhere. The main part of the water goes for circulation and even if the part going to circulation often is 99%, also the other part is important during the summer, more than 5 l/m2/day, i.e. more than 10000 liters per day in a midsize Finnish garden of 2000 m2.

In the embodiment of the FIG. 2, there is a condenser and an evaporator. The cooling of the greenhouse of the invention is explained. FIG. 2 presents a condenser 10, here it is a spray condenser, to the lower end of which warm air from the greenhouse is blown (alternatively it is sucked from the upper end) by means of a blower 12 which air flows upwards through the condenser and is returned cooled back to the greenhouse. Cold or cooler water is lead to the sprinkler 13 in the upper end of the condenser from the outer side of the greenhouse 1 from the evaporator 16. Cold water is lead down through small holes in the sprinkler 13. Thin water jets with a speed of ca 2 m/s meet the upwards-moving air flow with a speed of preferably ca 5 m/s, whereby there is an efficient heat exchange between water and air. The temperature and amount of water decide the temperature and humidity of the return air. The water collected on the bottom 14 of the condenser is lead to an external evaporator 16 by means of a pump 15.

The structure of the evaporator 16 is similar to the condenser 10. The water warmed up in the evaporator 16 and coming from the condenser 10 is lead to a sprinkler 18 therein, and the water flowing from that down in form of showers. An air flow from the outer side flows in the evaporator 16 against the water stream which is achieved by means of a blower 17. The outer air is most often cooler but in any case essentially dryer than the internal air, wherefore the outer air cools down the water flowing in the evaporator when evaporating. The cooled water is further lead by means of a pump to the sprinkler 13 of the condenser being inside. When necessary, water is introduced to the system in accordance with the difference in amounts concerning the evaporated amount in the evaporator and the condensed amount in the condenser.

The evaporator evaporates at least as much and usually ca twice the amount compared to what is condensed from the air humidity in the greenhouse and that is why water has to be added to the common water circulation, or in the case of an intermediate heat exchanger, to the own circulation of the evaporator (this water can e.g. be seawater). In FIG. 2, there is also presented the place for adding water (no reference number). In principal, no outlet for water is needed in the evaporator, only an inlet, but in practice, the outlet has to be there because of dirt and accumulation of salts for continuous daily wash and cleaning. In FIG. 2, this outlet is below the water inlet (no reference number).

It is essential for the method that the heat capacity of the water flow of the condenser is 3-6 times the capacity of the air flow; in this way, the heat exchange of the condenser is as advantageous as possible in view of the energy required for the blowing and air pumping. The effect of the heat exchange in the spray condenser is directly proportional to the amount of the circulation water, the height of the spray, the incidental speed of the air and water, and the total surface area calculated for the sprays. Because of this, it is preferable for the condenser and the evaporator of the invention that the height of the condenser is 2-4 m, the diameter of the sprays is 1-3 mm and the incidental speed of the water jets and air is 5-8 m/s. For example in a condenser with a cross section area of 1 m2, the required air flow is ca 5 m3/s and water flow ca 10 l/s.

If enough cool cooling water of 0-15 degrees is available in the vicinity of the greenhouse, the evaporator part of the system can be excluded and cool cooling water be lead directly to the sprinkler of the condenser. However, also in this case it has to be ensured that the internal water circulation in the condenser is sufficient. When there is no water of good quality suitable for watering available, the water circuits can be separated by an intermediate heat exchanger 31 as shown in the FIG. 3. Condensation water of the internal circuit can be used for example for watering of the plants when on the contrary water from the environment of a worse quality can be used in the external circuit, i.e. in the evaporator, for example seawater. Plenty of clean water is needed for watering in greenhouses. Usually, the greenhouse plants evaporate more than 90% of the water uptaken. Thus, in areas where there is not enough water, the water evaporated from the plants can be recovered with the above mentioned apparatus to be reused.

Another embodiment of the closed greenhouse of the invention is thus presented in FIG. 3 having a condenser and an evaporator but wherein the water circuits are separated by an intermediate heat exchanger 31.

In this case, the water coming out from the condenser 10 is cooled down by an intermediate heat exchanger 31 between the evaporator 16 and the condenser 10 and the water going to the evaporator 16 is heated. The intermediate heat exchanger 31 separates the water circulations of the condenser 10 and evaporator 16 from each other, whereby the water warmed up by the air of the greenhouse coming from the lower end of the condenser 10 in the water circulation of the condenser has been lead to the sprinkler 13 in the upper end of the condenser 10 cooled down by the water circulating in the evaporator. The water cooled down by the outer air and coming from the lower end of the evaporator 10 has been lead to the sprinkler 13 in the upper end of the evaporator 16 warmed up by the water circulating in the condenser. More water is accumulated in the condenser when the humidity of the greenhouse air is condensed into the cold water. The accumulated water is completely salt free and it can be recovered through the outlet 14 for example for watering of the plants or to moisture the air. Correspondingly, water has to be added to the evaporator (even e.g. sea water is suitable) in accordance with the thermal energy transferred from the condenser, the amount of which can be double compared to the water amount condensed in the condenser.

In different embodiments, the mantle of the condenser can be manufactured of a film or textile or the wall of the greenhouse can form a part of the structure of the system.

In a greenhouse, especially in a closed greenhouse, the regulation of the humidity is in addition to the temperature regulation a basic condition for preferable growth conditions. The plants evaporate 0.4(–1) liters of water in warm conditions per square meter in an hour. If the air circulation is 20 l/m2/s it is 72 m3/h which is the same thing as 93 kg/h. When the temperature of the air going to the spray condenser is 26 degrees and the relative humidity 80%, the air contains 17 g water/kg. So that the air humidity of the greenhouse would stay constant, moisture has to be removed from the greenhouse in an amount corresponding to the amount evaporating from the plants, 400/m2/h, which is 400/93 g/kg per cubic meter air which is 4.3 g/kg, why the moisture of the outgoing air has to be 12.7 g/kg corresponding to the condensation point of air of 18° C. Thus the ingoing temperature of the cooling water circulating in the condenser can be 18° C. at the most. If the water temperature is essentially lower and a humidity of 80% is desired to be kept in the greenhouse, the water flow has to be restricted or additional moisture has to be introduced in the greenhouse by spraying. Also in lower temperatures, when the evaporation of the plants takes place to a lower extent, the moisture of the greenhouse is regulated by regulating the temperature of the condensation surfaces of the condenser.

While the present invention has been described in accordance with preferred compositions and embodiments, it is to be understood that certain substitutions and alterations may be made thereto without departing from the spirit and scope of the following claims.

The invention claimed is:

1. A system for regulating a climate of a greenhouse by means of cooling water, comprising:

a condenser in operative engagement with a closed greenhouse, the greenhouse having warm air disposed within the greenhouse, the warm air being isolated from outside air disposed outside the greenhouse so that no outside air is being let in through ventilation doors or blown into the greenhouse, pipe means in fluid communication with the condenser for leading cooling water to the condenser, delivering means connected to the pipe means for delivering the cooling water into the condenser to exchange heat between the warm air and the cooling water to cool the warm air and to condense humidity in the warm air into water, the condenser having an outlet defined within the condenser to lead out overflow water from the condenser, the outlet being in operative engagement with the condenser and having a conduit connected to the condenser, the conduit having conduit means for removing the overflow water from the condenser without re-circulating the overflow water back to the condenser, a pump in operative engagement with the condenser to lead a main part of water collected in the pump from the condenser back for circulation to the pipe means, a blower in operative engagement with the condenser having blowing means for blowing warm air from the greenhouse, to be cooled down, into the condenser, and means for introducing carbon dioxide into the greenhouse.

2. The system of claim 1 wherein the system further comprises a water storage from which water is lead to the condenser.

3. The system of claim 1 wherein the outlet is adapted to lead away water condensed from the warm greenhouse air.

4. The system of claim 1 wherein the pipe means, for leading cooling water, is disposed in an upper end of the condenser.

5. The system of claim 1 wherein the blower is arranged to blow warm air to a lower end of the condenser.

6. The system of claim 1 wherein the system further comprises an evaporator in operative engagement with the condenser, a pipe in fluid communication with a sprinkler of the condenser and a pump of the evaporator.

7. The system of claim 6 wherein the system further comprises a blower in operative engagement with the evaporator for transferring outside air to the evaporator.

8. The system of claim 6 wherein the system further comprises a pipe in fluid communication with the pump of the condenser and a sprinkler of the evaporator.

9. The system of claim 6 wherein the pump connected to the condenser is adapted to lead water, accumulated at a bottom of the condenser, to the evaporator.

10. The system of claim 6 wherein the evaporator has a water inlet defined within the evaporator.

11. The system of claim 6 wherein the system further comprises an intermediate heat exchanger disposed between the evaporator and the condenser, the intermediate heat exchanger separating water circulations of the condenser and the evaporator from each other.

12. The system of claim 2 wherein the system further comprises an intermediate heat exchanger disposed between the water storage and the condenser.

13. The system of claim 1 wherein a mantle of the condenser is manufactured by a film or textile.

14. The system of claim 1 wherein a greenhouse wall is part of a system structure.

15. A greenhouse having a system for regulating the climate of the greenhouse by means of cooling water, the system comprising:

a condenser in operative engagement with a closed greenhouse, the greenhouse having warm air disposed within the greenhouse, the warm air being isolated from outside air disposed outside the greenhouse so that no outside air is being let in through ventilation doors or blown into the greenhouse, pipe means in fluid communication with a water storage and the condenser for leading cooling water from the water storage to the condenser, the condenser having an outlet defined within the condenser, the outlet having conduit means for leading away overflow water, warmed up in the condenser by the greenhouse air, from the condenser without re-circulating the overflow water back to the condenser, and a pump disposed inside the condenser and below the outlet for leading a main part of water collected in the pump from the condenser for circulation to the pipe means for leading cooling water.

16. A method for regulating a climate of a greenhouse connected to a system, comprising:

providing a condenser having a conduit for leading cooling water to the condenser, the condenser having an outlet defined in the condenser, introducing cooling water into the condenser, greenhouse air encountering and heating up the cooling water introduced into the condenser and the cooling water cooling the greenhouse air, condensing humidity of the greenhouse air into water, cooling a main part of the water and re-circulating the main part of the water back to the condenser, and collecting an overflow of water in the condenser and leading away the overflow water without re-circulating the overflow water back to the condenser, introducing cooling water further comprises introducing cooling water from a water storage disposed outside the greenhouse, introducing cooling water from an evaporator connected to the condenser, blowing out or sucking in outside air to the evaporator and leading water, warmed up in the condenser, and permitting the outside air come in contact with the water previously warmed up water in the condenser, while the warmed up water is streaming downwardly, the outside air cooling down the downwardly streaming water.

17. The method of claim 16 wherein the method further comprises leading water accumulated at a bottom of the condenser to the evaporator.

18. The method of claim 16 wherein the method further comprises leading water accumulated at a bottom of the evaporator to the condenser.

19. The method of claim 16 wherein the method further comprises cooling water coming out of the condenser and heating water going to the evaporator by an intermediate heat exchanger disposed between the evaporator and the condenser.

20. The method of claim 19 wherein the method further comprises separating water circulations of the condenser and the evaporator from each other by the intermediate heat exchanger disposed between the evaporator and the condenser for cooling water coming out from the condenser and for warming up water going to the evaporator.

* * * * *

UNITED STATES PATENT AND TRADEMARK OFFICE
CERTIFICATE OF CORRECTION

PATENT NO. : 8,826,676 B2  
APPLICATION NO. : 11/720445  
DATED : September 9, 2014  
INVENTOR(S) : Esko Huhta-Koivisto and Jukka Huttunen Page 1 of 1

It is certified that error appears in the above-identified patent and that said Letters Patent is hereby corrected as shown below:

Title page, item (73) Assignee should read as follows: NOVARBO OY, Eura (FI)

Signed and Sealed this  
Fifth Day of May, 2015

Michelle K. Lee  
*Director of the United States Patent and Trademark Office*